United States Patent [19]

Okumura et al.

[11] Patent Number: 5,142,393

[45] Date of Patent: Aug. 25, 1992

[54] ELECTRO-OPTICAL LIQUID CRYSTAL DEVICE WITH COMPENSATOR HAVING NEGATIVE OPTICAL ANISOTROPY

[75] Inventors: Osamu Okumura; Motoyuki Toki; Hirosada Horiguchi, all of Suwa, Japan

[73] Assignee: Seiko Epson Corporation, Tokyo, Japan

[21] Appl. No.: 466,232

[22] Filed: Jan. 19, 1990

[30] Foreign Application Priority Data

| Jan. 19, 1989 | [JP] | Japan | 1-10405 |
| Feb. 16, 1989 | [JP] | Japan | 1-36623 |
| Feb. 27, 1989 | [JP] | Japan | 1-37570 |
| Feb. 27, 1989 | [JP] | Japan | 1-45609 |
| Mar. 24, 1989 | [JP] | Japan | 1-72815 |
| Mar. 28, 1989 | [JP] | Japan | 1-76114 |
| Apr. 6, 1989 | [JP] | Japan | 1-87436 |
| Apr. 25, 1989 | [JP] | Japan | 1-105019 |
| Apr. 27, 1989 | [JP] | Japan | 1-108571 |

[51] Int. Cl.⁵ ................ G02F 1/1335; G02F 1/13
[52] U.S. Cl. ........................... 359/73; 359/102
[58] Field of Search ..................... 350/347 R

[56] References Cited

U.S. PATENT DOCUMENTS

| 4,844,569 | 7/1989 | Wada et al. | 350/347 R |
| 4,889,412 | 12/1989 | Clerc et al. | 350/347 R |
| 4,957,349 | 9/1990 | Clerc et al. | 350/347 R |

FOREIGN PATENT DOCUMENTS

| 0297841 | 1/1989 | European Pat. Off. | 350/337 |
| 0123944 | 10/1978 | Japan | 350/337 |

Primary Examiner—Stanley D. Miller
Assistant Examiner—Anita Pellman Gross
Attorney, Agent, or Firm—Kaplan Blum

[57] ABSTRACT

An electro-optical liquid crystal display device includes at least one of the optically anisotropic layers has three main refractive indices N1o, N2o and N3e. The axis corresponding to N3e is in the direction approximately parallel to the surfaces of the substrates of the liquid crystal cell and N3e is smaller than N1o and N2o. The device may include a homogenous or twisted liquid crystal cell with the cell and anisotropic layer sandwiched between two polarizers.

37 Claims, 9 Drawing Sheets

ELECTRO-OPTICAL LIQUID CRYSTAL DEVICE WITH COMPENSATOR HAVING NEGATIVE OPTICAL ANISOTROPY

BACKGROUND OF THE INVENTION

This invention relates to an electro-optical device, and in particular to a liquid crystal display device which includes an optically anisotropic layer.

In a conventional homogeneous ECB liquid crystal device a twisted nematic liquid crystal device, or a super twisted nematic liquid crystal device, display is effected by control of the double refraction of liquid crystals. Thus, coloration of the display is inevitable. Japanese Patent Application No. 62-121701 attempts to avoid coloration by providing an optical anisotropic substance in addition to a liquid crystal display cell. This is referred to as an "NTN mode" liquid crystal display device.

Figure 3:
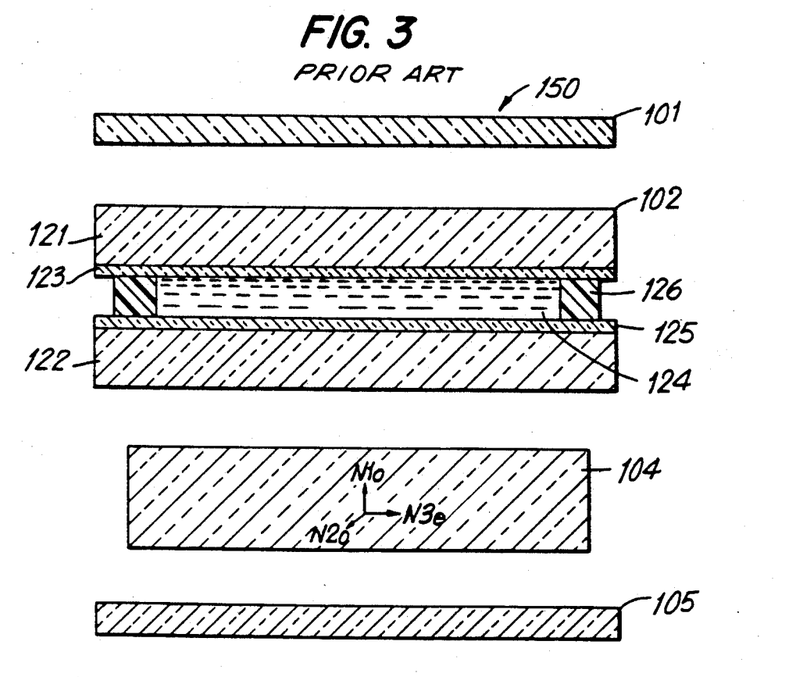
FIG. 3 is a exploded cross-sectional view of a conventional electro-optical liquid crystal display device.

A typical art NTN mode electro-optical liquid crystal device is shown in cross-section in FIG. 3. Electro-optical device 150 includes an upper polarizer 101, a liquid crystal cell 102, an optically anisotropic layer 104 and a lower polarizer 105. Liquid crystal cell 102 includes a liquid crystal material 124 disposed between an upper substrate 121 having transparent electrodes 123 disposed thereon and a lower substrate 122 with transparent electrodes 125 disposed thereon. A spacer 126 serves to hold substrates 121 and 122 apart.

ZLI-4287 ($\Delta n = 0.0929$) (product of Merck Co.) is used as liquid crystal material 124 in liquid crystal cell 102 and it is homogeneously oriented in cell 102 having a cell gap (d) of 5.9 $\mu$m. The retardation ($\Delta n \times d$) is 0.55 $\mu$m.

Optically anisotropic layer 104 is a monoaxially stretched film of, for example, a polycarbonate having refractive indices of $N1o = 1.589$, $N2o = 1.590$ and $N3e = 1.594$. The film thickness is 140 $\mu$m, and the retardation is 0.56 $\mu$m. $N3e$ is the refractive index in the stretched direction of the film or the direction of the optical axis. A conventional monoaxially stretched film has a refractive index of an extraordinary ray (Ne) which is larger than the refractive index of an ordinary ray (No). Thus, the optically anisotropic substance is said to have an optically positive uniaxiality.

Figure 4:
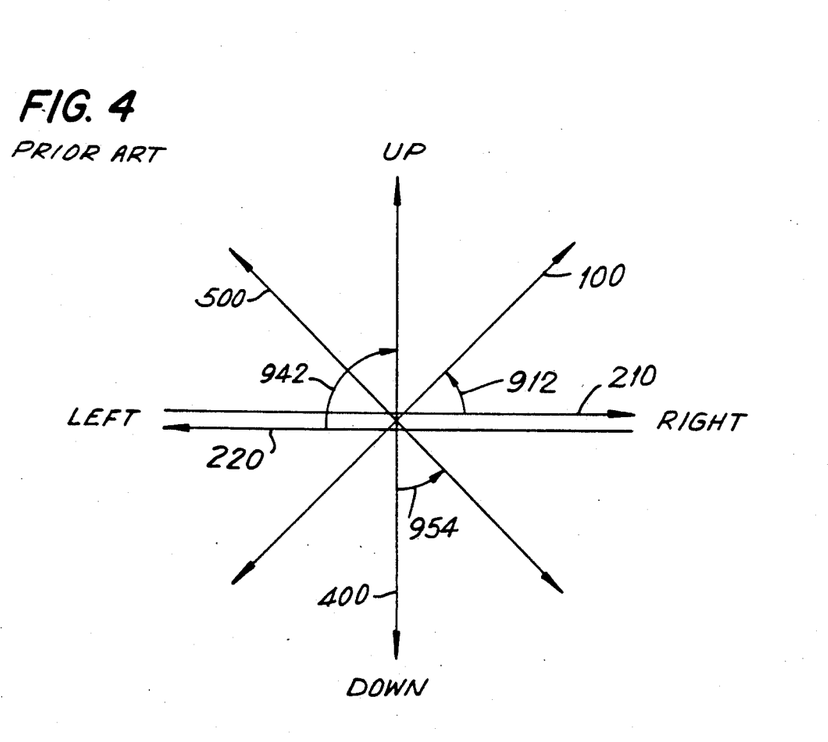
FIG. 4 diagrammatically illustrates the direction of the various axes and rubbing directions of the electro-optical liquid crystal display device of FIG. 3.

FIG. 4 illustrates the relationship of the respective axes of a conventional electro-optical liquid crystal device including a monoaxially stretched film. The polarization axis (absorption axis) 100 of upper polarizing plate and the rubbing direction 210 of upper substrate 121 of liquid crystal cell 102 form an angle 912 of 45°. The angle 942 between the stretch direction 400 of the monoaxially stretched film and the rubbing direction 220 of lower substrate 122 of the liquid crystal cell is 90°. An angle 954 between the polarization axis (absorption axis) 500 and stretched direction 400 of lower polarizing plate 105 is 45°.

Figure 5:
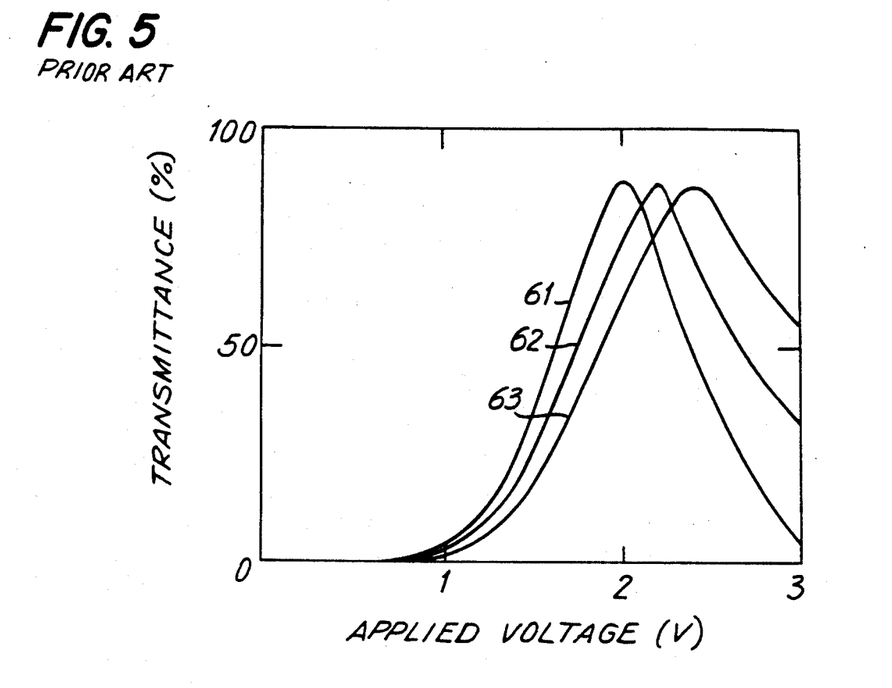
FIG. 5 illustrates the electro-optical characteristics of the electro-optical liquid crystal devices of FIG. 1 and FIG. 3.

FIG. 5 illustrates the electro-optical characteristics of electro-optical liquid crystal device 150 of FIG. 3. Curves 61, 62 and 63 are voltage-transmittance curves for light rays having wavelengths of 450 nm, 550 nm, and 650 nm, respectively, applied in a direction vertical to the plane of the panel. It is evident from FIG. 5 that the transmittance values are low in the OFF state in each case. Thus, electro-optical liquid crystal device 150 has excellent characteristics for displaying high contrast images when observed from a direction vertical to the plane of the panel.

Figure 7:
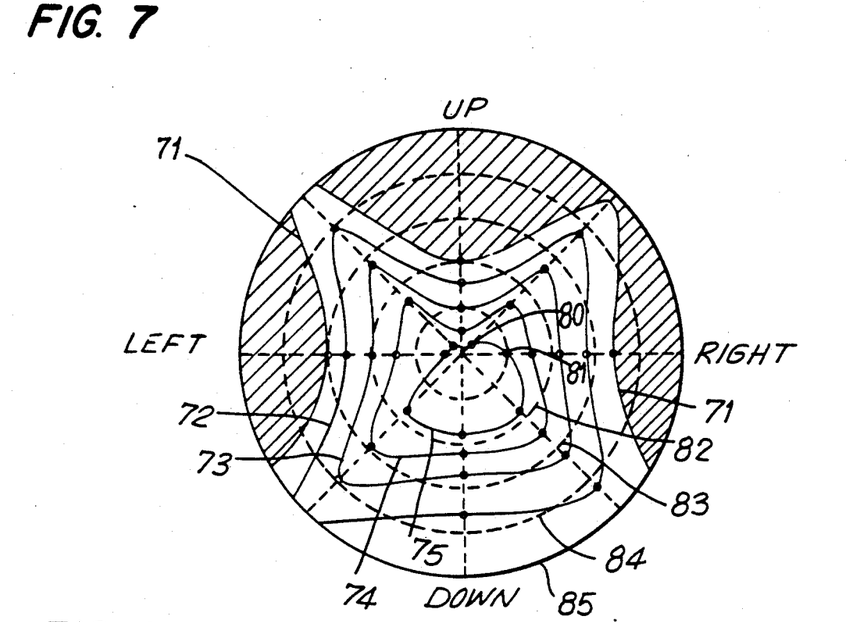
FIG. 7 illustrates the viewing angle characteristics o the electro-optical liquid crystal device of FIG. 3.

However, conventional NTN mode-type electro-optical liquid crystal devices have a narrow visual angle range ("visual angle") in which the displayed image may be viewed satisfactorily. FIG. 7 illustrates the visual angle characteristics of electro-optical liquid crystal devices in such as device 150. The center 80 of FIG. 7 represents the direction vertical to the panel plane, and outer circles 81, 82, 83, 84 and 85 represent inclined angles of 10°, 20°, 30°, 40° and 50°, respectively, in the direction vertical from the center of the circles. The four up, down, left and right directions in FIG. 7 correspond to the four directions shown in FIG. 4. Curves 71, 72, 73, 74 and 75 represent isocontrast curves having contrast ratios of 1, 3, 10, 30 and 100, respectively. The shadowed region has a contrast ratio of 1 or less, in which the display is reversed.

As mentioned above, conventional NTN mode-type electro-optical liquid crystal devices suffer from a narrow high contrast region and an easily reversed display. The reversed display psychologically contributes significantly in causing the sense of a narrow visual angle.

Accordingly, it is desirable to provide an improved electro-optical liquid crystal device which eliminates these problems associated with conventional devices and provides a high contrast image with a broad viewing angle.

SUMMARY OF THE INVENTION

Generally speaking, in accordance with the invention, an improved electro-optical liquid crystal device including at least one optically anisotropic layer having three main refractive indices N1o, N2o and N3e. The device includes a liquid crystal cell and at least one optically anisotropic layer disposed between an upper and a lower polarizer. A spacer serves to hold the substrates apart The axis corresponding to N3e is in the direction approximately parallel to the surfaces of the substrates of the liquid crystal cell and N3e is less than N1o and N2o.

The optically anisotropic layer is preferably a monoaxially stretched film of a polymer of an acrylate derivative having the formula: $CH_2=CX-COOR$ wherein X is $-CH_3$, $-Cl$, $-B$, $-CN$, or $-SCN$ and R is an alkyl group having 1 to 4 carbon atoms or a benzene ring derivative, a mixture including a polymer of the above describe acrylate derivative and a liquid crystal or liquid crystal polymer, a polystyrene film, a film formed of a copolymer of polystyrene and an organic polymer, a film formed of a mixture of polystyrene and an organic polymer or a laminate of polystyrene organic polymer films. The wavelength dispersion value ($v_{RF}$) of the double refractive indices ($\Delta n$) of the optically anisotropic layer ($v_{RF}=\Delta n (450 nm)/\Delta n(650 nm)$) is preferably greater than 0.95 multiplied by the wavelength dispersion value ($v_{LC}$) of the double refractive indices ($\Delta n$) of the liquid crystal material of the liquid crystal cell.

Accordingly, it is an object of the invention to provide and improved electro-optical liquid crystal device.

Another object of the invention is to provide an improved electro-optical liquid crystal device having a high contrast ratio and wide viewing angle.

A further object of the invention is to provide an improved electro-optical liquid crystal device in which the display is not easily reversed.

Still a further object of the invention is to provide an improved electro-optical liquid crystal device including an optically anisotropic layer of a monoaxially stretched polymer film having an optically negative uniaxiality.

Still other objects and advantages of the invention will in part be obvious and will in part be apparent from the specification and drawings.

The invention accordingly comprises the several steps and the relation of one or more of such steps with respect to each of the others, and the construction possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to the following descriptions taken in connection with the accompanying drawings, in which.

DETAILED DESCRIPTION OF THE PREFERRED EMBODIMENTS

Figure 17:
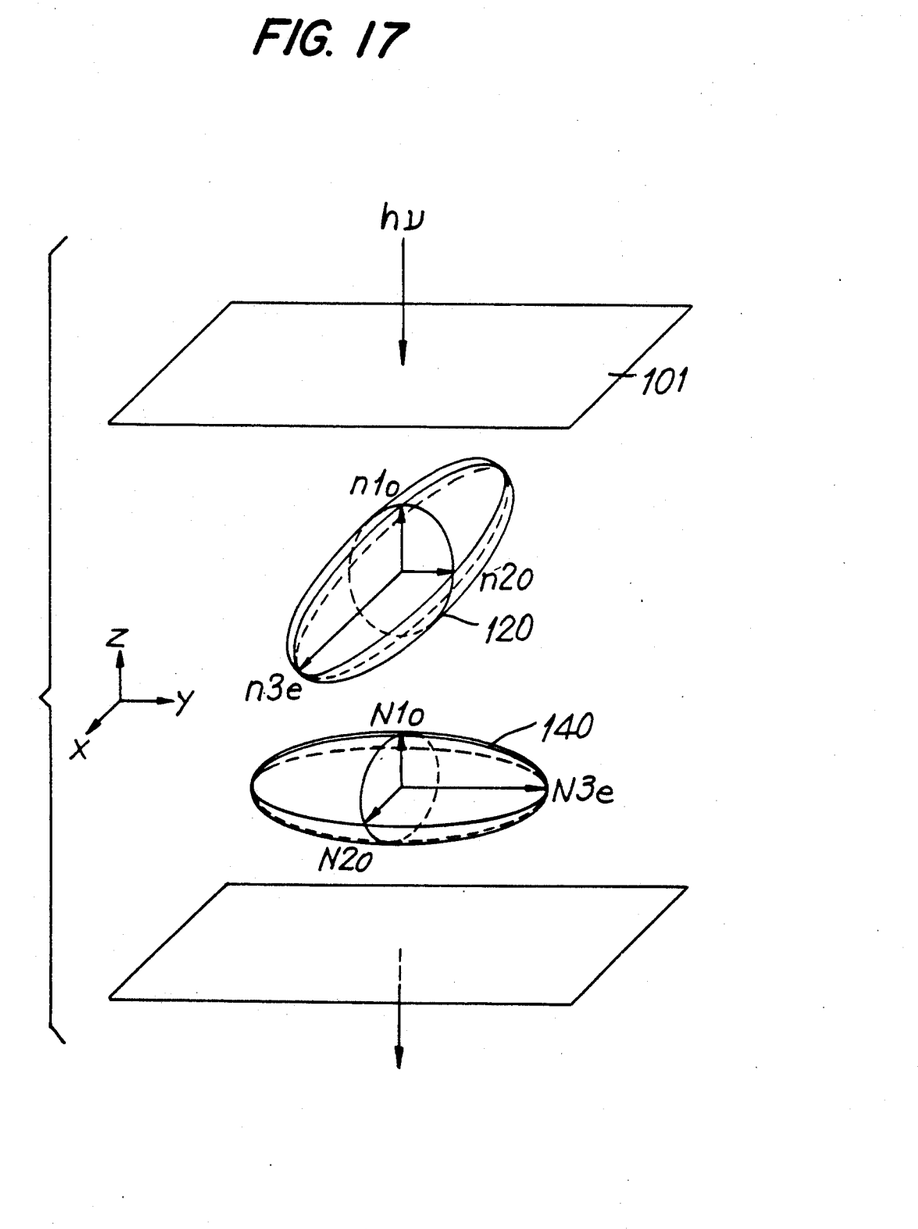
FIG. 17 illustrates the mechanism of optical compensation of conventional electro-optical liquid crystal devices.

In electro-optical liquid crystal display device 150, the optically anisotropic layer for color compensation essentially functions to compensate in the direction vertical to the plane of the panel. The optically anisotropic material does not compensate in any other direction. FIG. 17 illustrates the mechanism of optical compensation of electro-optical liquid crystal display device 150. The twist angle of liquid crystal material 124 in cell 102 is set at zero degrees to simplify the explanation. An index ellipsoid 120 of the liquid crystal display and an index ellipsoid 140 of optically anisotropic film 103 for color compensation are both ellipsoids having the shape of a rugby ball. Ellipsoids 120 and 140 each have an optically positive uniaxiality.

Index ellipsoid 120 of liquid crystal material 124 of liquid crystal cell 102 has three main refractive indices: n1o, n2o and n3e. n3e represents the refractive index in the major axis direction of the liquid crystal molecule, n2o represents the refractive index in the direction perpendicular to the major axis direction in the panel plane, and n1o represents the refractive index in the direction perpendicular to the plane of the panel. Index ellipsoid 140 of optically anisotropic film 103 also has three main refractive indices: N1o, N2o and N3e. When optically anisotropic film 103 is a monoaxially stretched film, N3e represents the refractive index in the film-stretching direction, N2o represents the refractive index in the direction perpendicular to the film-stretching direction in the plane of the film, and N1o represents the refractive index in the direction of the thickness of the film.

Index ellipsoids 120 and 140 overlap each other so that optically extraordinary axes n3e and N3e are at right angles to each other. Thus, as light is introduced in the direction vertical to the plane of the panel (in the direction of the Z-axis in FIG. 17), ordinary rays and extraordinary rays are exchanged between each other in liquid crystal cell 102 and the optically anisotropic film 103. Thus, light leaves the cell in a state similar to the state in which light was introduced into the cell. If the absorption axes of polarizing plates 101 and 105 ar oriented perpendicular to each other (the cross-nicol state) the display is black and complete compensation can be effected to lights of all colors.

However, optically anisotropic film 103 does not compensate for the coloration of light rays introduced from a direction other than the direction of the X-axis. For instance, a ray of light introduced in a direction inclined from the direction of the major axis (the direction of X-axis in FIG. 17) of liquid crystal material 124 of liquid crystal cell 102 from the direction of Z-axis is not taken into consideration and not compensated for. From the direction, the refractive index $n_e$ of the extraordinary ray in the liquid crystal cell is small. Thus, the value of the refractive index anisotropy ($\Delta n \equiv |n_e - n_o|$) of the liquid crystal cell is also small. However, since the values of refractive indices No and Ne of an ordinary ray and an extraordinary ray respectively, of optically anisotropic film 103 are maintained constant irrespective of the incident angles, a difference occurs during retardation between liquid crystal cell 102 and optically anisotropic film 103 resulting in an unbalanced compensation condition.

Figure 16:
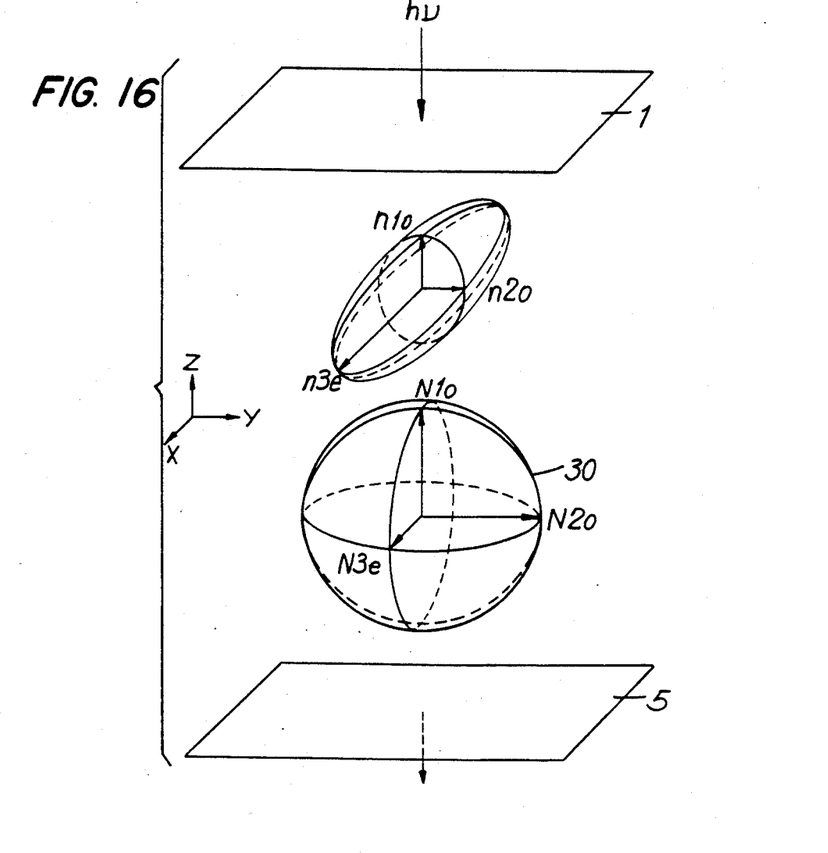
FIG. 16 illustrates the mechanism of optical compensation of the electro-optical liquid crystal display device in accordance with the invention.

Reference is now made to FIG. 16, which illustrates the mechanism of optical compensation of an electro-optical liquid crystal display device in accordance with the invention. An index ellipsoid 30 of optically anisotropic layer 3 is a frisbee-shaped rotary ellipsoid having an optically negative uniaxiality whereby compensation allowing a broader viewing angle is possible. FIG. 16 illustrates the aspect different from conventional devices that the refractive index N3e of the extraordinary ray of the optical anisotropic film is less than refractive indices N1o and N2o of the ordinary ray of the same film. Index ellipsoid 30 is the same as the index ellipsoid of conventional devices when observed from the direction of Z-axis. However, it has different double refractive indices for other directions. For example, a ray introduced into cell 2 from a direction inclined from the X-axis in some angles from the direction of Z-axis will be taken into consideration. In this direction, $n_e$ of the liquid crystal cell is apparently small so that the value of $\Delta n$ is small. As opposed to this, the value of $\Delta n (\equiv Ne--No|)$ of optically anisotropic film 103 is also small, since Ne is enlarged. Thus, the difference in retardation between the liquid crystal cell and optically anisotropic 3 film generated in the direction inclined from the direction of Z-axis is minimized by the use of an optically anisotropic film having an optically negative uniaxiality. The same compensation relationship applies to light introduced from any other direction. Thus, compensation over a broader viewing field range is possible in a device in accordance with the invention than in the case of conventional devices and a broader viewing angle can be obtained.

Figure 8:
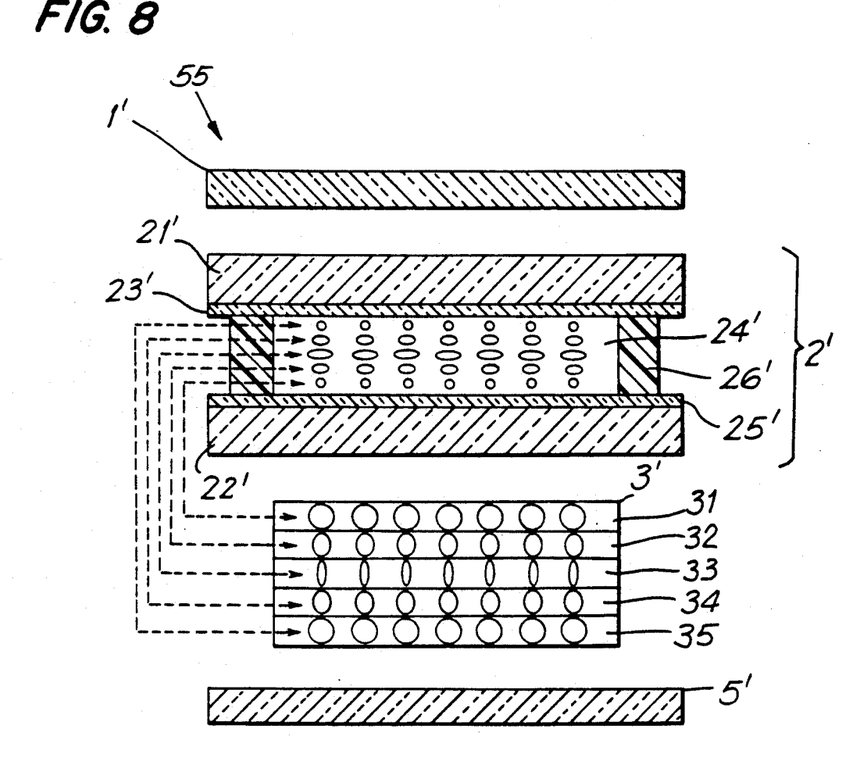
FIG. 8 is an exploded cross-sectional view of an electro-optical liquid crystal display device assembled in accordance with an alternative embodiment of the invention.

Generally, even when the liquid crystal cell has a twist angle, compensation is possible using a plurality of optically anisotropic films. When a plurality of films 31, 32, 33, 34 and 35 are laminated, to form an optically anisotropic layer 3', it has a twist angle vertical to the twisted angle of liquid crystal cell 2', as shown in FIG. 8. In this case, two layers contacting each other at the interface between liquid crystal cell 2' and optically anisotropic film 3' are symmetrical to each other and have the above compensation relationship. The corresponding relationship of the pairs of symmetrical layers is shown by the dotted lines in FIG. 8. Thus, even when the optically anisotropic layer includes a twisted angle, an optically negative uniaxiality is advantageous for obtaining a broader visual angle.

When some compensation, but not as much compensation as above, is provided by the use of one or two monoaxially stretched films, the use of one or two monoaxially stretched films each having an optically negative uniaxiality is recommended for the purpose of enlarging the viewing angle without interfering with the display characteristics of the panel.

The following examples are set forth by way of illustration to show the electro-optical liquid crystal device in accordance with the invention. They are set forth for purposes of illustration only, and are not intended in a limiting sense.

EXAMPLE 1

Figure 1:
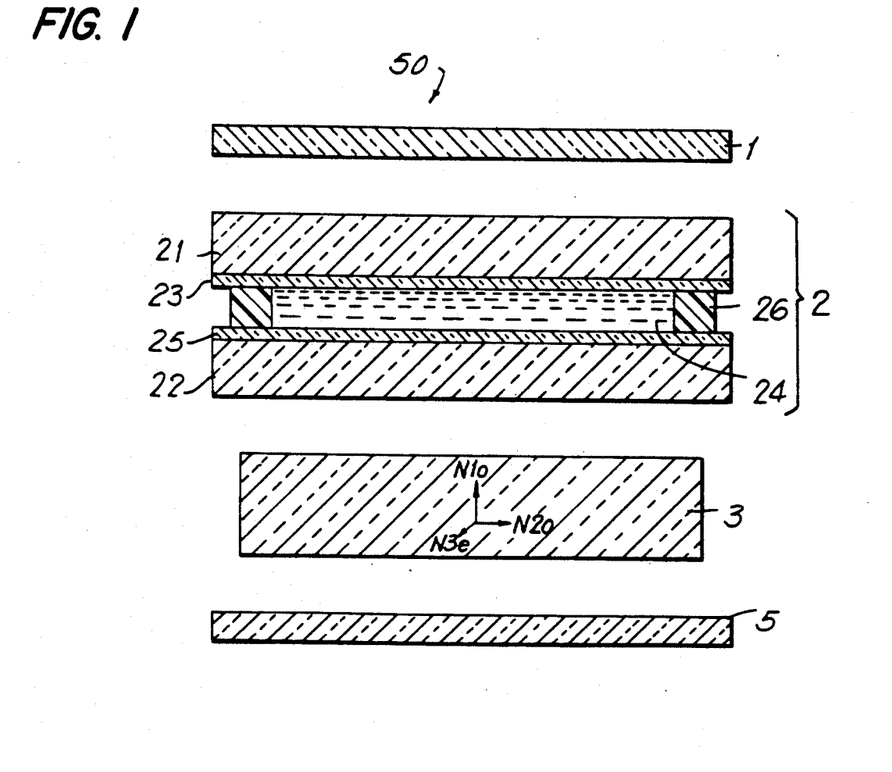
FIG. 1 is an exploded cross-sectional view of an electro-optical liquid crystal display device assembled in accordance with the invention.

Liquid crystal display device 50 illustrated in FIG. 1 includes a liquid crystal cell 2 of a liquid crystal material 24 disposed between an upper substrate 21 and a lower substrate 22 with transparent electrodes 23 and 25 disposed on the interior surfaces of the substrates. A spacer 26 serves to hold substrates 21 and 22 apart. ZL1-4287 [($\Delta n = 0.0929$) (product of Merck Co.)] was used as a liquid crystal material 24 in liquid crystal cell 2. Liquid crystal material 24 was homogeneously oriented in the cell with a cell gap (d) of 5.9 $\mu$m. An upper polarizer 1 is disposed on the exterior surface of upper substrate 21 and an optically anisotropic film 3 having a optically negative uniaxiality is disposed on the exterior surface of lower substrate 22. A lower polarizer 5 is placed on the exposed surface of optically anisotropic film 3.

Polymethyl methacrylate (PMMA) film was stretched at 100° C. in silicone oil and used as optically anisotropic film 3. When ordinary polymer films are stretched, the refractive index in the stretched direction increases and the stretched films have an optically positive uniaxiality. However, when PMMA or polymethyl α-fluoroacrylate (PMFA) is stretched, the refractive index in the stretched direction decreases so that the stretched film has an optically negative uniaxiality. The refractive indices of the PMMA film were N1o=1.4906, N2o=1.4906 and N3e=1.4900. The film thickness was 930 $\mu$m, and the retardation ($\Delta n \times d$) was 0.56 $\mu$m.

Figure 2:
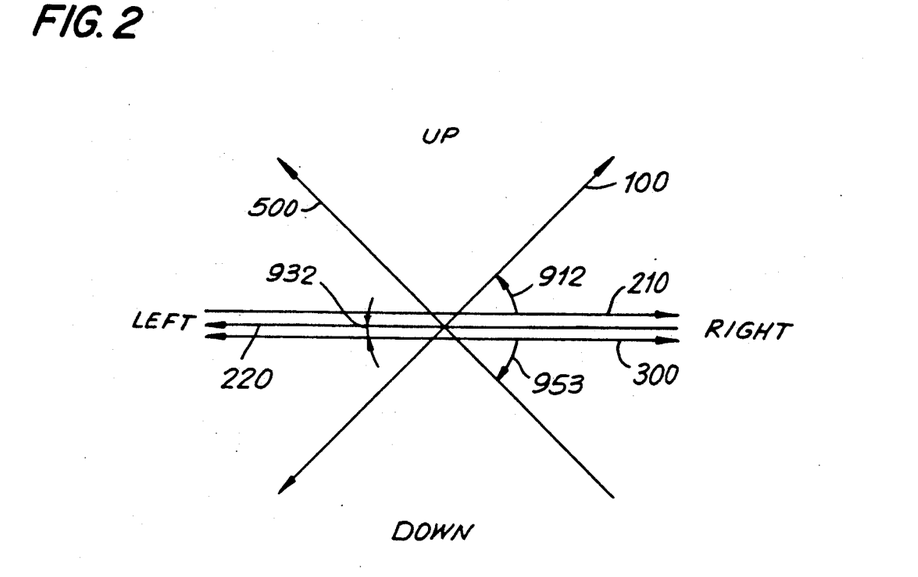
FIG. 2 diagrammatically illustrates the direction of the various axes and rubbing directions of the electro-optical liquid crystal display device of FIG. 1

FIG. 2 diagrammatically illustrates the relationship of the respective axes of electro-optical liquid crystal display device 50. An angle 912 between polarization axis (absorption axis) 100 of upper polarizing plate 1 and rubbing direction 210 of upper substrate 21 of liquid crystal cell 2 and is about 45° to the left. An angle 932 between stretched direction 300 of monoaxially stretched film 3 and rubbing direction 220 of lower substrates 22 of liquid crystal cell 2 and is about 0° (zero) and an angle 953 between polarization axis (absorption axis) 500 of lower polarizing plate 5 and stretch direction 300 of optically anisotropic film 3 is 45 degrees to the right.

The electro-optical liquid crystal device in accordance with the invention has many of the same characteristics as conventional electro-optical liquid crystal device 150 shown in FIG. 5, when it is observed from the direction vertical to the plane of the panel.

Figure 6:
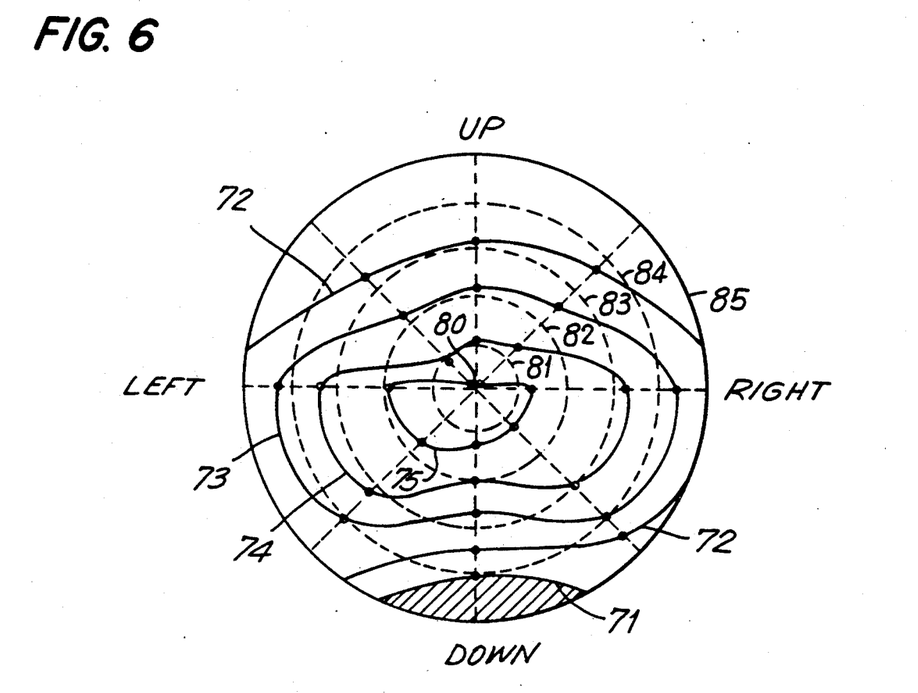
FIG. 6 illustrates the viewing angle characteristics of the electro-optical liquid crystal display device of FIG. 1.

FIG. 6 illustrates the viewing angle characteristics of electro-optical liquid crystal display device 50. The center of FIG. 6 represents the direction vertical to the plane of the panel, and each of the outer circles 81, 82, 83, 84 and 85 represent inclined angels of 10°, 20°, 30°, 40° and 50° from the vertical direction of the center, respectively. The four directions: up, down, left and right in FIG. 6 correspond to the four directions shown in FIG. 2. Isocontrast curves 71, 72, 73, 74 and 75 have contrast ratios 1, 3, 10, 30 and 100, respectively. The shadowed region has a contrast ratio of 1 or less, and the display is reversed.

When FIG. 6 is compared with FIG. 7, which illustrates the viewing angle characteristics of conventional electro-optical display device 150, it can be seen that display device 50 exhibits very little reversal due to a small leakage of light in the OFF state. Thus, electro-optical display device 50 constructed and arranged in accordance with the invention has a broad viewing angle range.

EXAMPLE 2

Example 2 illustrates a method for compensating for coloration in a super-twisted liquid crystal display device.

FIG. 8 is a sectional view of an electro-optical liquid crystal display device 55 arranged in accordance with a second embodiment of the invention. Electro-optical liquid crystal device 55 includes an upper polarizer 1', a lower polarizer 5' and a liquid crystal cell 2' and an optically anisotropic substance 3' disposed between polarizers 1' and 5'. Liquid crystal cell 2' includes a liquid crystal material 24' disposed between an upper substrate 21' and a lower substrate 22' with transparent electrodes 23' and 25' on the interior surface.

Optically anisotropic layer 3' is a laminate of five monoaxially stretched, optically anisotropic PMMA films 31, 32, 33, 34 and 35. The refractive indices are $N1o = 1.4906$, $N2o = 1.4906$ and $N3e = 1.4900$. The thickness of each film was 300 μm and the retardation ($\Delta n \times d$) was 0.18 μm. ZL1-4337 ($\Delta n = 0.1569$) (product of Merck Co.) was used as liquid crystal material 24' with a twisted orientation in the cell with a cell gap (d) of 5.7 μm.

Figure 9:
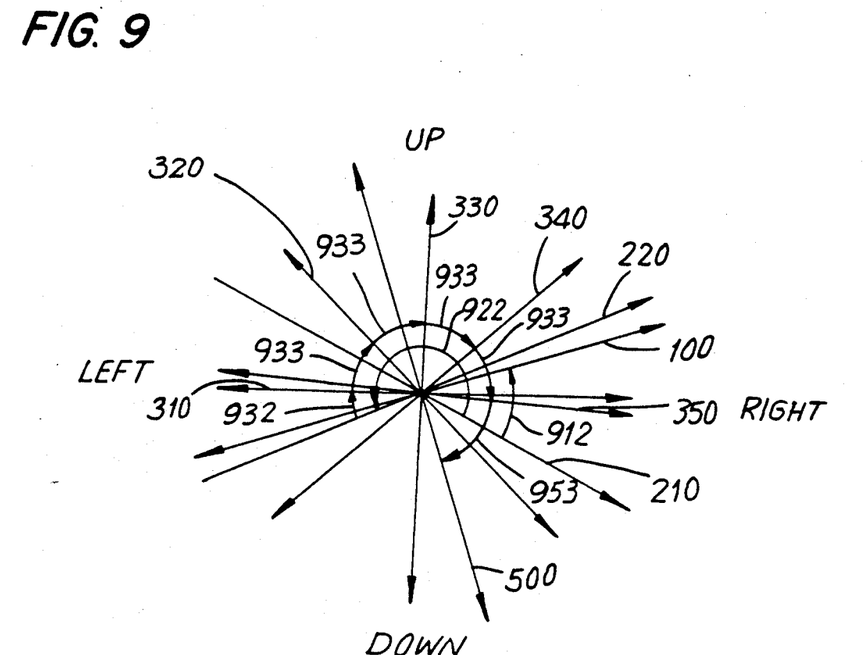
FIG. 9 diagrammatically illustrates the direction of the various axes and rubbing directions of the electro-optical liquid crystal display device of FIG. 8.

FIG. 9 illustrates the relationship of the respective axes of electro-optical liquid crystal device 55. Angle 912 formed by polarization axis (absorption axis) 100 of upper polarizer and rubbing direction 210 of upper substrate 21' of liquid crystal cell 2' is 45° to the left. Twist angle 922 of liquid crystal material 24 is 230° to the left. Angle 932 formed by stretched direction 310 of first layer 32 of monoaxially stretched film 3' and rubbing direction 220 of lower substrate 22' of liquid crystal cell 2' is about 23° to the right. Angle 933 between the stretch direction of monoaxially stretched film of the n'th layer and the stretch direction of monoaxially stretched film of the (n−1)'th layer is about 46° to the right. Angle 953 between direction 500 of the polarization axis (absorption axis) of lower polarizer 5' and stretched direction 350 of monoaxially stretched film of fifth layer 35 of monoaxially stretched film 3' is about 68° to the right.

Electro-optical liquid crystal display device 55 has a broader viewing angle range compared with conventional electro-optical liquid crystal display device 150.

EXAMPLE 3

A liquid crystal display device was prepared in accordance with Example 1, except that ZL1-4243 ($\Delta n = 0.1449$) (product of Merck Co.) was the liquid crystal material twisted in the cell with a cell gap (d) of 6.2 μm.

A monoaxially stretched PMMA film was used as optically anisotropic film 3. The refractive indices of the film were $N1o = 1.4906$, $N2o = 1.4906$ and $N3e = 1.4900$. The film thickness was 950 μm, and the retardation was 0.57 μm.

Figure 10:
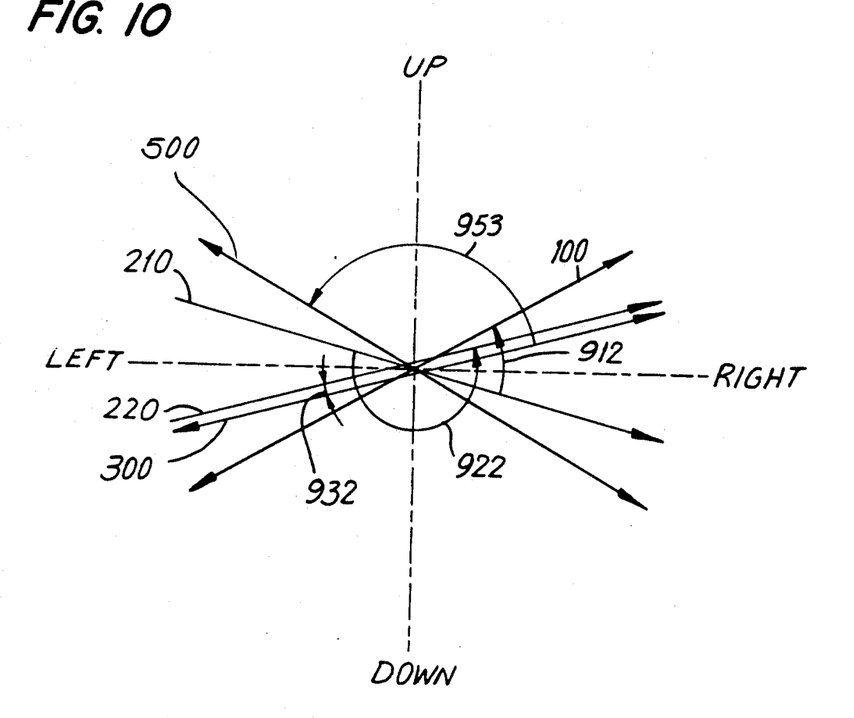
FIG. 10 diagrammatically illustrates the direction of the various axes and rubbing directions of a electro-optical liquid crystal display device of FIG. 9.

FIG. 10 illustrates the relationship of the respective axes of the electro-optical liquid crystal device. Angle 912 between polarization axis (absorption axis) 100 of upper polarizer 1 and rubbing direction 210 of upper substrate 21 of liquid crystal cell 2 is about 45° to the left. Twist angle 922 is about 210° to the left. Angle 932 between stretched direction 300 of monoaxially stretched film 3 and rubbing direction 220 of lower substrate 22 of liquid crystal cell is 0°. Angle 953 which represents the angular difference between polarization axis (absorption axis) 500 of lower polarizing plate 5 and stretch direction 300 of optically anisotropic film 3 is 135° to the left.

Figure 11:
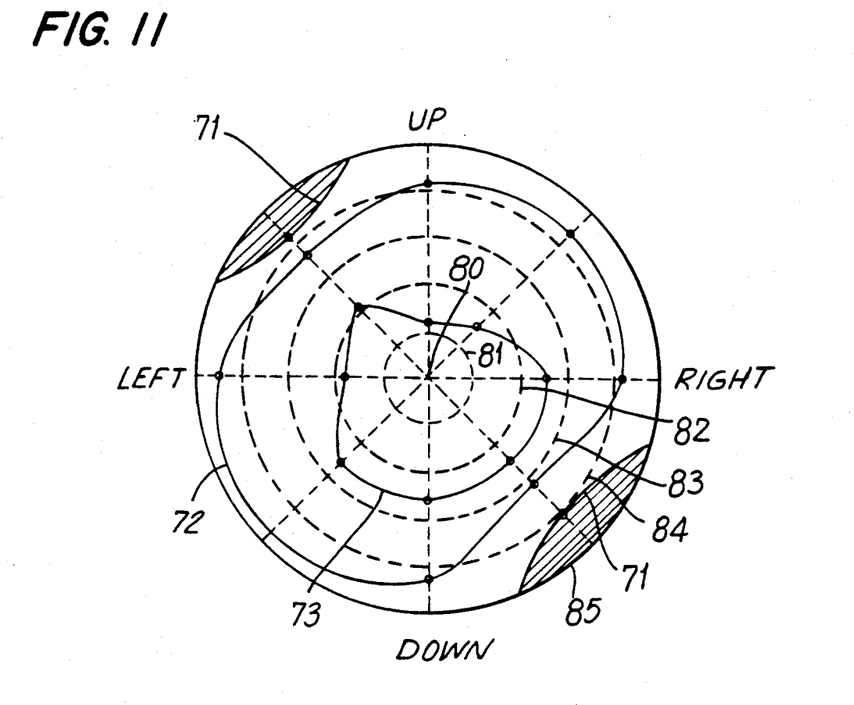
FIG. 11 illustrates the viewing angle characteristics of a electro-optical liquid crystal display device assembled as shown in FIG. 1.
Figure 12:
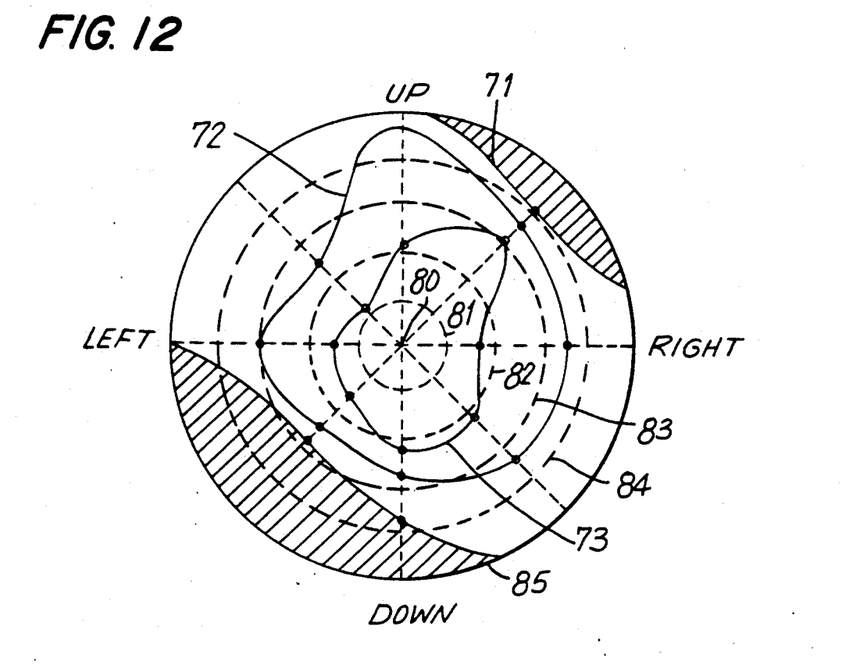
FIG. 12 illustrates the viewing angle characteristics of a conventional electro-optical liquid crystal display device.

FIG. 11 illustrates the viewing angle characteristics of the electro-optical liquid crystal display device. For comparison, the same electro-optical liquid crystal display device prepared under the same conditions, except using a conventional 140 μm thick polycarbonate film ($N1o = 1.589$, $N2o = 1.590$, $N3e = 1.594$) provided a viewing angle characteristic as shown in FIG. 12. Center 80 of each FIG. 11 and 12 represents the direction vertical to the plane of the panel and outer circles 81, 82, 83, 84 and 85 represent directions with inclined angles of 10°, 20°, 30°, 40° and 50° from the vertical direction, respectively, from center 80. The four directions: up, down, left and right in FIGS. 11 and 12 correspond to the four directions shown in FIG. 10. Isocontrast curves 71, 72 and 73 have contrast ratios of 1, 3 and 10, respectively.

The shadowed region has a contrast ratio of 1 or less, and the display is reversed. Based on a comparison of FIGS. 11 and 12 it is understood that the electro-optical display device prepared in accordance with the invention has a broader high-contrast region and a wider viewing angle range than conventional devices. Additionally, the display is rarely reversed in the devices prepared in accordance with the invention.

EXAMPLE 4

Figure 13:
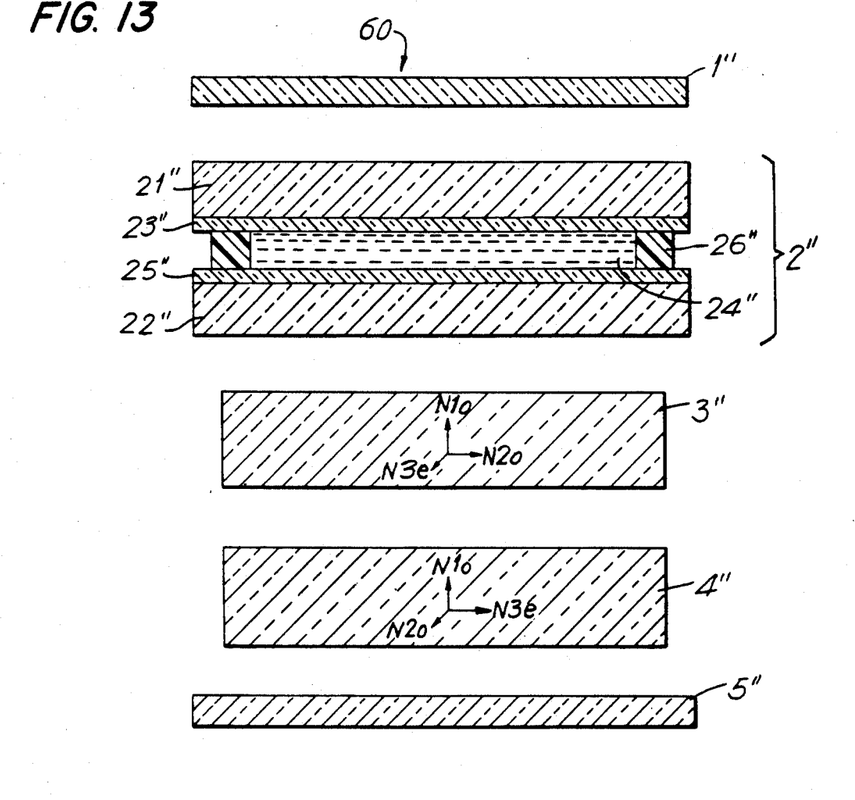
FIG. 13 is an exploded cross-sectional view of an electro-optical liquid crystal display device assembled in accordance with an alternative embodiment of the invention.

FIG. 13 is a sectional view of an electro-optical liquid crystal display device 60 with an upper polarizer 1", a lower polarizer 5", and a liquid crystal cell 2", an optically anisotropic film 3" having an optically negative uniaxiality and an optically anisotropic film 4" having a optically positive uniaxiality. Liquid crystal cell 2" includes a liquid crystal material 24" disposed between an upper substrate 21" and a lower substrate 22" with transparent electrodes 23" and 25" disposed thereon. A spacer 26" serves to hold substrates 21" and 22" apart.

ZLI-3941 ($\Delta n = 0.1639$) (product of Merck Co.) was used as liquid crystal material 24" and twistedly oriented in the cell with a cell gap (d) of 5.5 μm. A 630 μm thick monoaxially stretched PMMA film was used as optically anisotropic film 3" having an optically negative uniaxility. Film 3" had refractive indices of $N1o = 1.4906$, $N2o = 1.4906$ and $N3e = 1.4900$. The retardation was about 0.38 μm.

A 105 μm thick polycarbonate film was used as optically anisotropic film 4" having an optically positive uniaxiality. Film 4" had refractive indices of $N1o = 1.589$, $N2o = 1.590$ and $N3e = 1.594$. The retardation was about 0.42 μm.

Figure 14:
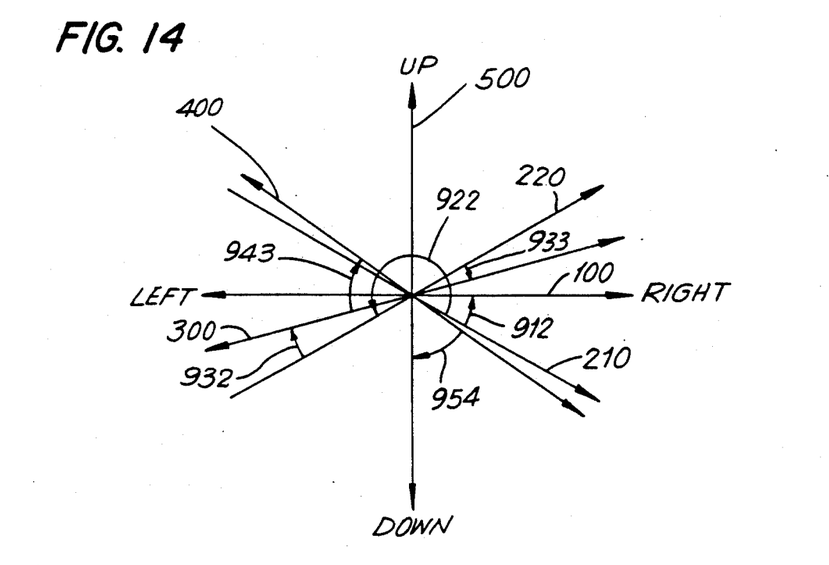
FIG. 14 diagrammatically illustrates the direction of the various axes and rubbing directions of the electro-optical liquid crystal display device of FIG. 13.

FIG. 14 illustrates the relationship of the respective axes of electro-optical liquid crystal display device 60. Angle 912 between polarization axis (absorption axis) 100 of upper polarizer 1" and rubbing direction 210 of upper substrates 21" of liquid crystal cell 2" is about 30° to the left. The twist angle 922 of liquid crystal 24" is about 240° to the left. Angle 932 between stretch direction 330 of monoaxially stretched film 3" and rubbing direction 22 of lower substrate 22" of liquid crystal cell 2" is about 15° to the left (+15°). Angle 943 between stretch directions 400 and 300 of monoaxially stretched film 4" is about 50° to the right. Angle 954 between polarization axes (absorption axes) 500 and 400 of both polarizers is about 55° to the right.

Electro-optical liquid crystal display device 60 in accordance with the invention has a wider viewing angle range compared to conventional electro-optical liquid crystal display device 150. Thus, it is possible to broaden and enlarge the viewing angle range of an electro-optical liquid crystal display device using both an optically anisotropic film having an optically positive uniaxiality and an optically anisotropic film having an optically negative uniaxiality.

In Examples 1-4, a monoaxially stretched PMMA film was used as the optically anisotropic film. However, PMMA has small double refractive indices. Thus, the film is thick. In Examples 5-13, optically anisotropic films were prepared from polymers that are preferable to PMMA.

EXAMPLE 5

A liquid crystal display device was prepared as in with Example 1, except that phenylα-chloroacrylate was synthesized and polymerized and formed into a film. The film was stretched at 110° C. at a stretching speed of 3 mm/sec and a 600 μm thick monoaxially stretched film was obtained. The film had a birefringence ($\Delta n$) of 0.0009 and ($\Delta n \times d$ of 0.54 μm). An electro-optical liquid crystal device having a broad visual angle range was obtained.

EXAMPLE 6

Liquid crystal display devices were prepared as in Example 1, except that Biphenylα-bromoacrylate, biphenyl methacrylate, biphenylα-cyanoacryalte and biphenyl α-thio-cyanoacrylate were synthesized and polymerized individually. Each of the polymers was formed into a thin film. The thin films were stretched at 120° C. at a stretching speed of 5 mm/sec to obtain 500 μm thick sheets. In each case the sheet was a monoaxially stretched film and each of the stretched films had ($\Delta n \times d$) equal to 0.55 μm. Electro-optical liquid crystal devices having broad visual angle ranges were obtained.

EXAMPLE 7

Liquid crystal display devices were prepared as in Example 1, except that naphthalene methacrylate, naphthalene α-chloroacrylate, naphthalene α-cyanoacrylate and naphthalene α-thiocyanoacrylate were synthesized and polymerized individually. Each of polymers prepared were formed into a thin film. The thin films were each stretched at 100° C. at a stretching speed of 5 mm/sec to obtain 500 μm thick sheets. In each case the sheet was a monoaxially stretched film and each of the stretched films had ($\Delta n \times d$) equal to 0.55 μm. Electro-optical liquid crystal display devices having broad viewing angle ranges were obtained.

EXAMPLE 8

A liquid crystal display device was prepared in accordance with Example 1, except that an NCY-type nematic liquid crystal material having the formula:

was added to a toluene solution of PMMA in an amount of 15% by weight of PMMA. The resulting solution was spread over water and dried to obtain a 500 μm thick film. The film was stretched at 120° C. at a stretching speed of 0.5 mm/sec to obtain a 270 μm thick stretched film having a stretched magnification of 1.8 and a product ($\Delta n \times d$)=0.55. An electro-optical liquid crystal display device having a broad viewing angle range was obtained.

EXAMPLE 9

A liquid crystal display device was prepared as in Example 1, except that a PCH-type nematic liquid crystal having the formula:

was added to a THF solution of PMMA. The resulting mixture was spread over water to obtain a 200 μm thick film. The film was stretched at 120° C. to obtain a 100 μm thick stretched film with ($\Delta n \times d$) equal to 0.55 μm. An electro-optical liquid crystal display device having a broad viewing angle range was obtained.

EXAMPLE 10

A liquid crystal display device was prepared as in Example 1, except that a side-chain type polymer liquid crystal having the molecular structure was added to a toluene solution of PMMA in an amount of 20% by weight of PMMA.

The solution was spread over water to obtain a 500 μm thick film. The film was stretched at 120° C. to form a 270 μm thick stretched film and ($\Delta n \times d$) equal to 0.55 μm. An electro-optical liquid crystal display device having a broad viewing angle range was obtained.

Although PMMA was used Examples 8-10, polymers of other acrylate derivatives, for example phenyl α-chloroacrylate, biphenyl α-bromoacrylate, biphenyl methacrylate or naphthalene methacrylate, can also be used instead of PMMA to obtain the same results.

EXAMPLE 11 liquid crystal display device was prepared as in Example 1, except that a commercial 50 μm thick polystyrene film was stretched at 120° C. at a stretching speed of 0.5 mm/sec to obtain a 40 μm thick monoaxially stretched polystyrene film. The monoaxially stretched film had a stretched magnification of 1.4 and ($\Delta n \times d$) equal to 0.55 μm.

The film was used in the same manner as in Example 1, and an electro-optical liquid crystal display device having a broad viewing angle range was obtained.

Polystyrene has a much larger value of $\Delta n$ generated by stretching, than PMMA. Accordingly, an extremely thin polystyrene film is required to obtain the necessary value of ($\Delta n \times d$). However, polystyrene also has low heat-resistance, polystyrene films having a thickness level of several ten millimicrons would mostly be deformed when stretched, thus, it is difficult to obtain uniformly stretched films from thin polystyrene films.

The following Examples 12 and 13 will illustrate the means of overcoming this problem.

EXAMPLE 12

A liquid crystal display device was prepared as in Example 1, except that a Styrene (St) monomer and MMA monomer were copolymerized in the presence of an anionic catalyst. The ratio of St monomer to MMA monomer was 2''. The resulting copolymer was formed into a thin film having a thickness of 200 μm. The film was stretched at 150° C. at a stretching speed of 0.5 mm/sec to obtain a 150 mm thick stretched film having a product $(\Delta n \times d) = 0.55$ μm. The resulting film had an extremely narrow distribution of $(\Delta n \times d)$, and films of high quality can be produced with high reproducibility.

An electro-optical liquid crystal display device having a broad viewing angle range was obtained.

EXAMPLE 13

A liquid crystal display device was prepared as in Example 1, except that a 200 μm thick polycarbonate film was prepared. The film was coated with polystyrene by dipping in a toluene solution of polystyrene. The polystyrene coat 50 μm thick. The coated film was stretched at 170° C. to obtain a uniform film having $(\Delta n \times d)$ equal to 0.55 μm.

An electro-optical liquid crystal display device having a broad viewing angle range was obtained.

EXAMPLE 14

The value n of a monoaxially stretched film varies, generally with the wavelength of the light applied thereto. The wavelength dispersion value (ν) of birefringence ($\Delta n$) is defined by the following formula, on the basis of the value $\Delta n$ to the light of 450 nm. and the value $\Delta n$ to the light of 650 nm.

$$\nu \equiv \Delta n \ (450 \ nm) \ / \ \Delta n \ (650 \ nm)$$

Figure 15:
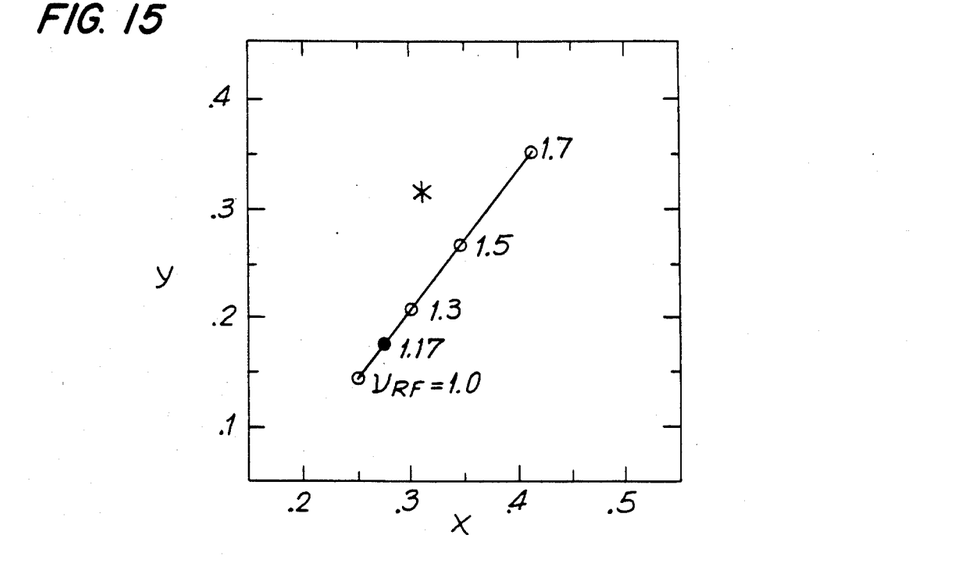
FIG. 15 illustrates the influence of the wavelength dispersion value ($\nu_{RF}$) of the double refractive indices ($\Delta n$) of the optical anisotropic layer on the coloration of the display of the electro-optical liquid crystal display device of FIG. 14.

In the liquid crystal display devices of Example 3, coloration of the display significantly varies in accordance with the wavelength dispersion value ($\nu_{RF}$) of birefringence $\Delta n$ of the monoaxially stretched film. FIG. 15 shows the variation of coloration of the display in accordance with variation of the value ($\nu_{RF}$) from 1.0 to 1.7, on the chromaticity coordinates of a CIE 1931 XYZ chromaticity diagram, where the mark (*) in the center of FIG. 15 is the neutral point. Values nearest the neutral point (*) indicate less coloration. The $\nu_{RF}$ value of a monoaxially stretched film of an ordinary polymer is about 1.06. When the value is increased to the level of the wavelength dispersion value of $\Delta n$ of $\nu_{LC}$), in this example, about 1.17 or higher, and preferably between about 1.3 and 1.7, coloration is reduced.

For example, the monoaxially stretched film of the commercial polystyrene film used in Example 1 with a $\nu_{RF}$ of about 1.12 has a large $\nu_{RF}$ value compared with known polymers. The value is larger than 0.95 times the value $\nu_{LC}$ and the coloration of the display is less than when ordinary polymers are used. When a monoaxially stretched polystyrene film with an optically negative uniaxiality was used as the optically anisotropic substance, the viewing angle range of the electro-optical liquid crystal display device improved and broadened.

EXAMPLE 15

In order to increase the coloration-reducing effect of the optically anisotropic film of Example 14, a film having a larger $\nu_{RF}$ value was used.

A monoaxially stretched film was prepared by blending polyvinyl chloride and a polymer liquid crystal compound. The film was stretched. The liquid crystal and the monoaxially stretched film had the following values (ν):

$\nu_{LC} = 1.17$
$\nu_{RF} = 1.30$

A liquid crystal device in accordance with Example 1 was prepared except that the above film was used. The coloration of the display device was reduced without interfering with the broad visual angle range and the high contrast display.

Films having large $\nu_{RF}$ values may be prepared using other methods. A film having a large value (ν) and a film having a small value (ν) may be laminated to mutually offset the respective retardations, or different polymers may be used.

In summary, electro-optical display device prepared in accordance with the invention includes at least one optically anisotropic layer disposed adjacent to the liquid crystal display cell between the polarizers. The optically anisotropic layer includes at least one stretched film having an optically negative uniaxiality. The liquid crystal cell includes a liquid crystal material disposed between two substrates with transparent electrodes. The liquid crystal material may be homogeneously oriented or twisted. The stretched polymer film results in a display device having a substantially widened viewing angle.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. An electro-optic liquid crystal display device comprising:

a liquid crystal display cell including a pair of spaced apart opposed substrates with transparent electrodes selectively disposed thereon and a liquid crystal material in the spaced between the substrates;

at least one optically anisotropic layer disposed adjacent to the liquid crystal cell, the optically anisotropic layer having three main refractive indices, N1o, N2o and N3e, wherein N3e is less than N1o and N2o, and an axis corresponding to N3e is in a direction approximately parallel to the surfaces of the substrates of the liquid crystal cell, the angle defined between the rubbing direction of the substrate adjacent the anisotropic layer and the drawing axis corresponding to N3e being set to a value ranging from about −23° to about +15°; and a pair of linear polarizers each having an axis of polarization disposed about the liquid crystal cell and optically anisotropic layer.

2. The display device of claim 1, wherein the liquid crystal material is homogeneously oriented.

3. The display device of claim 1, wherein the liquid crystal material is twisted.

4. The display device of claim 1, wherein the liquid crystal material is super-twisted with a twist angle greater than 90°.

5. The display device of claim 1, wherein said liquid crystal material has a twist angle of about 0°.

6. The display device of claim 1, wherein the optically anisotropic layer is a monoaxially stretched film.

7. The display device of claim 1, wherein the optically anisotropic layer is a polymethyl methacrylate film.

8. The display device of claim 6, wherein the optically anisotropic layer is a polymethyl α-fluoroacrylate film.

9. The display device of claim 6, wherein the optically anisotropic layer includes a polymer of an acrylate derivative represented by the general formula:

$$CH_2=CX-COOR$$

wherein X is selected from the group consisting of —$CH_3$, Cl, —Br, —CN or —SCH; and R is an alkyl group having from 1 to 4 carbon atoms or a benzene ring derivative.

10. The display device of claim 1, wherein the optically anisotropic layer is a plurality of monoaxially stretched films.

11. The display device of claim 1, wherein the optically anisotropic layer consists essentially of a mixture of a polymer of an acrylate derivative and a liquid crystal, wherein the acrylate derivative is represented by the general formula:

$$CH_2=CX-COOR$$

and X is selected from the group consisting of —$CH_3$, Cl, —Br, —CN or —SCH; and R is an alkyl group having from 1 to 4 carbon atoms or a benzene ring derivative.

12. The display device of claim 1, wherein the optically anisotropic layer includes a mixture of a polymer of an acrylate derivative and a liquid crystal polymer, wherein the acrylate derivative is represented by the general formula:

$$CH_2=CX-COOR$$

and X is selected from the group consisting of —$CH_3$, Cl, —Br, —CN or —SCH; and R is an alkyl group having from 1 to 4 carbon atoms or a benzene ring derivative.

13. The display device of claim 1, wherein the optically anisotropic layer is a monoaxially stretched polystyrene film.

14. The display device of claim 1, wherein the optically anisotropic layer includes a copolymer of polystyrene and an organic polymer.

15. The display device of claim 1, wherein the optically anisotropic layer includes a mixture of polystyrene and an organic polymer.

16. The display device of claim 1, wherein the optically anisotropic layer is a monoaxially stretched film of a polystyrene-organic polymer film laminate.

17. The display device of claim 1, wherein the wavelength dispersion value ($\nu_{RF}$) of the double refractive indices ($\Delta n$) of the optically anisotropic layer ($\nu_{RF}=\Delta n$ (450 nm) / $\Delta n$ (650 nm)) is larger than 0.95 times the wavelength dispersion value ($\nu_{LC}$) of the double refractive indices ($\Delta n$) of the liquid crystal material of the liquid crystal cell.

18. The display device of claim 1, wherein a wavelength dispersion value ($\nu_{RF}$) of double refractive indices ($\Delta n$) of the optically anisotropic layer where $\nu_{RF}$ equals a ratio of the $\Delta n$ at a first wavelength to the $\Delta n$ at a second wavelength and is equal to or larger than 1.17.

19. The display device of claim 1, wherein the wavelength dispersion value $\nu_{RF}$ is in the range of from about 1.3 to about 1.7.

20. The display device of claim 1, wherein the optically anisotropic layer is a laminate of monoaxially stretched films.

21. The display device of claim 1, wherein said angle is essentially 0°.

22. An electro-optic liquid crystal display device comprising:

a liquid crystal display cell including a pair of spaced apart opposed substrates with transparent electrodes selectively disposed thereon and a liquid crystal material in the spaced between the substrates;

at least one optically anisotropic layer disposed adjacent to the liquid crystal cell, the optically anisotropic layer having three main refractive indices, N1o, N2o and N3e, wherein N3e is less than N1o and N2o, and an axis corresponding to N3e is in a direction approximately parallel to the surfaces of the substrates of the liquid crystal cell, wherein the N3e axis and the rubbing direction of the substrate adjacent the anisotropic layer are not essentially orthogonal; and a pair of linear polarizers each having an axis of polarization disposed about the liquid crystal cell and optically anisotropic layer.

23. An electro-optic liquid crystal display device, comprising:

a liquid crystal display cell including a pair of spaced apart opposed substrates with transparent electrodes selectively disposed thereon and a liquid crystal material in the spaced between the substrates;

at least one optically anisotropic layer disposed adjacent to the liquid crystal cell, the optically anisotropic layer having three main refractive indices N1o, N2o and N3e, wherein N3e is less than N1o and N2o, and an axis corresponding to N3e is in a direction approximately parallel to the surfaces of the substrates of the liquid crystal cell;

a pair of linear polarizers each having an axis of polarization disposed about the liquid crystal cell and optically anisotropic layer; and a wavelength dispersion value ($\nu_{RF}$) of double refractive indices ($\Delta n$) of the optically anisotropic layer where $\nu_{RF}$ equals a ratio of the $\Delta n$ at a first wavelength to the $\Delta n$ at a second wavelength and is larger than 0.95 times the wavelength dispersion value ($\nu_{LC}$) of double refractive indices ($\Delta n$) of the liquid crystal material of the liquid crystal cell.

24. The display device of claim 23, wherein $\nu_{RF}=\Delta n$ (450 nm)/$\Delta n$ (650 nm).

25. The display device of claim 23, wherein the wavelength dispersion value $\nu_{RF} \geq 1.17$.

26. The display device of claim 23, wherein the wavelength dispersion value $\nu_{RF}$ is in the range of from about 1.3 to about 1.7.

27. The display device of claim 23, wherein the angle defined between the rubbing direction of the substrate adjacent th anisotropic layer and the axis corresponding to N3e is set to a predetermined value so as to increase the viewing angle of the liquid crystal display device.

28. An electro-optic liquid crystal display device, comprising:
- a liquid crystal display cell including a pair of spaced apart opposed substrates with transparent electrodes selectively disposed thereon and a liquid crystal material in the space between the substrates, the liquid crystal material having a twist angle of about 0°;
- at least one optically anisotropic layer disposed adjacent to the liquid crystal cell, the optically anisotropic layer having three main refractive indices N1o, N2o, and N3e, wherein N3e is less than N1o and N2o, and an axis corresponding to N3e is in a direction approximately parallel to the surfaces of the substrates of the liquid crystal cell;
- a pair of linear polarizers each having an axis of polarization disposed about the liquid crystal cell and optically anisotropic layer; and
- a wavelength dispersion value ($\nu_{RF}$) of double refractive indices ($\Delta n$) of the optically anisotropic layer where $\nu_{RF}$ equals a ratio of the $\Delta n$ at a first wavelength to the $\Delta n$ at a second wavelength and is larger than 0.95 times the wavelength dispersion value ($\nu_{LC}$) of double refractive indices ($\Delta n$) of the liquid crystal material of the liquid crystal cell.

29. An electro-optic liquid crystal display device, comprising:
- a liquid crystal display cell including a pair of spaced apart opposed substrates with transparent electrodes selectively disposed thereon and a liquid crystal material in the space between the substrates;
- at least one optically anisotropic layer disposed adjacent to the liquid crystal cell, the optically anisotropic layer having three main refractive indices N1o, N2o, and N3e, wherein N3e is less than N1o and N2o, and an axis corresponding to N3e is in a direction approximately parallel to the surfaces of the substrates of the liquid crystal cell;
- a pair of linear polarizers each having an axis of polarization disposed about the liquid crystal cell and optically anisotropic layer; and
- a wavelength dispersion value ($\nu_{RF}$) of double refractive indices ($\Delta n$) of the optically anisotropic layer where $\nu_{RF}$ equals a ratio of the $\Delta n$ at a first wavelength to the $\Delta n$ at a second wavelength, is equal to or larger than 1.17.

30. The display device of claim 29, wherein $\nu_{RF} = \Delta n$ (450 nm)/$\Delta n$ (650 nm).

31. The display device of claim 29, wherein the wavelength dispersion value $\nu_{RF}$ is in the range of from about 1.3 to about 1.7.

32. The display device of claim 29, wherein the angle defined between the rubbing direction of the substrate adjacent the anisotropic layer and the axis corresponding to N3e is set to a value ranging from −23° to about +15°.

33. An electro-optic liquid crystal display device, comprising:
- a liquid crystal display cell including a pair of spaced apart opposed substrates with transparent electrodes selectively disposed thereon and a liquid crystal material in the space between the substrates, the liquid crystal material having a twist angle of about 0°;
- at least one optically anisotropic layer disposed adjacent to the liquid crystal cell, the optically anisotropic layer having three main refractive indices N1o, N2o, and N3e, wherein N3e is less than N1o and N2o, and an axis corresponding to N3e is in a direction approximately parallel to the surfaces of the substrates of the liquid crystal cell;
- a pair of linear polarizers each having an axis of polarization disposed about the liquid crystal cell and optically anisotropic layer; and
- a wavelength dispersion value ($\nu_{RF}$) of double refractive indices ($\Delta n$) of the optically anisotropic layer where ($\nu_{RF}$) equals a ratio of the $\Delta n$ at a first wavelength to the $\Delta n$ at a second wavelength, is equal to or larger than 1.17 times the wavelength dispersion value ($\nu_{LC}$) of double refractive indices ($\Delta n$) of the liquid crystal material of the liquid crystal cell.

34. An electro-optic liquid crystal display device, comprising:
- a liquid crystal display cell including a pair of spaced apart opposed substrates with transparent electrodes selectively disposed thereon and a liquid crystal material in the space between the substrates, the liquid crystal material having a twist angle of about 0°;
- at least one optically anisotropic layer disposed adjacent to the liquid crystal cell, the optically anisotropic layer having three main refractive indices N1o, N2o, and N3e, wherein N3e is less than N1o and N2o, and an axis corresponding to N3e is in a direction approximately parallel to the surfaces of the substrates of the liquid crystal cell; and
- a pair of linear polarizers each having an axis of polarization disposed about the liquid crystal cell and optically anisotropic layer.

35. The display device of claim 34, wherein the angle defined between the rubbing direction of the substrate adjacent the anisotropic layer and the drawing axis corresponding to N3e is set to a value ranging from about −23° to +15°.

36. The display device of claim 34, wherein a wavelength dispersion value ($\nu_{RF}$) of double refractive indices ($\Delta n$) of the optically anisotropic layer where $\nu_{RF}$ equals a ratio of the $\Delta n$ at a first wavelength to the $\Delta n$ at a second wavelength and is larger than 0.95 times the wavelength dispersion value ($\nu_{LC}$) of double refractive indices ($\Delta n$) of the liquid crystal material of the liquid crystal cell.

37. The liquid crystal display device of claim 34, wherein a wavelength dispersion value ($\nu_{RF}$) of double refractive indices ($\Delta n$) of the optically anisotropic layer where $\nu_{RF}$ equals a ratio of the $\Delta n$ at a first wavelength to the $\Delta n$ at a second wavelength and is equal to or larger than 1.17 times the wavelength dispersion value ($\nu_{LC}$) of double refractive indices ($\Delta n$) of the liquid crystal material of the liquid crystal cell.

* * * * *